United States Patent
Moraes

(10) Patent No.: US 7,810,336 B2
(45) Date of Patent: Oct. 12, 2010

(54) SYSTEM FOR INTRODUCING FUEL TO A FLUID FLOW UPSTREAM OF A COMBUSTION AREA

(75) Inventor: Ricardo F. Moraes, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1467 days.

(21) Appl. No.: 11/145,440

(22) Filed: Jun. 3, 2005

(65) Prior Publication Data

US 2006/0272332 A1 Dec. 7, 2006

(51) Int. Cl.
F02C 7/22 (2006.01)
F02C 1/00 (2006.01)

(52) U.S. Cl. .......................................... 60/776; 60/740
(58) Field of Classification Search ................. 60/776, 60/740, 743; 431/8, 346
See application file for complete search history.

(56) References Cited

U.S. PATENT DOCUMENTS

| | | | | |
|---|---|---|---|---|
| 2,607,191 A | * | 8/1952 | Lee | 60/749 |
| 3,360,929 A | * | 1/1968 | Drewry | 60/743 |
| 3,474,970 A | | 10/1969 | Simmons et al. | |
| 3,530,667 A | | 9/1970 | Bryan | |
| 3,578,264 A | | 5/1971 | Kuethe | |
| 4,030,875 A | * | 6/1977 | Grondahl et al. | 60/753 |
| 4,898,001 A | * | 2/1990 | Kuroda et al. | 60/733 |
| 5,165,241 A | * | 11/1992 | Joshi et al. | 60/737 |
| 5,460,002 A | | 10/1995 | Correa | |
| 5,479,781 A | | 1/1996 | Fric et al. | |
| 5,497,611 A | * | 3/1996 | Benz et al. | 60/776 |
| 5,609,030 A | * | 3/1997 | Althaus | 60/737 |
| 5,647,215 A | | 7/1997 | Sharifi et al. | |
| 5,676,712 A | * | 10/1997 | Anderson | 48/192 |
| 5,941,075 A | | 8/1999 | Ansart et al. | |
| 6,098,407 A | | 8/2000 | Korzendorfer et al. | |
| 6,232,005 B1 | | 5/2001 | Pettit | |
| 6,269,646 B1 | | 8/2001 | Lovett et al. | |
| 6,598,781 B2 | | 7/2003 | Hasz et al. | |
| 6,681,578 B1 | | 1/2004 | Bunker | |
| 2002/0069645 A1 | * | 6/2002 | Mowill | 60/776 |
| 2003/0115884 A1 | | 6/2003 | Boardman | |
| 2004/0079082 A1 | | 4/2004 | Bunker | |
| 2004/0079086 A1 | | 4/2004 | Smith et al. | |
| 2004/0144098 A1 | | 7/2004 | Willis et al. | |

* cited by examiner

Primary Examiner—Michael Cuff
Assistant Examiner—Gerald L Sung

(57) ABSTRACT

Aspects of the invention relate to a system and method for introducing fuel to the flow of air along a surface upstream of a combustion area. Fuel injectors can be used to deliver fuel to the air flow at or near the boundary layer of the air flow. The fuel injectors are ideally located substantially outside of the flow path. Many benefits can be realized by keeping the injectors out of the flow path including avoidance of potential excitations and smaller pressure drops in the flow. The potential of flame from the combustion area traveling upstream to the fuel injector can be minimized by creating a disturbance in the boundary layer of the flow downstream of the fuel injectors. Such disturbances can be achieved by placing a turbulence generator in the boundary layer. The turbulence generator can be a surface protrusion or a fluid cross-flow.

16 Claims, 7 Drawing Sheets

SYSTEM FOR INTRODUCING FUEL TO A FLUID FLOW UPSTREAM OF A COMBUSTION AREA

FIELD OF THE INVENTION

The invention relates in general to combustion systems and, more specifically, to systems and methods for delivering fuel to a fluid flow in a combustion system.

BACKGROUND OF THE INVENTION

In many combustion-based systems including, for example, turbine engines, fuel can be mixed with another fluid, such as air, prior to being delivered to and burned in a combustion area. Several problems can arise when introducing fuel to the flow path of a fluid upstream of a combustion area.

One known system 10 for introducing fuel to an air flow in a turbine engine is shown in FIG. 1. Air 12 from the compressor flows along a surface 14 of a turbine engine combustor component 16. A portion or layer of the air 12 that is at and in the immediate vicinity of the surface 14 is referred to as the boundary layer 18. The air flow 12 has an associated velocity profile 20. The velocity of the air 12 at the boundary layer 18 approaches substantially zero.

As shown, fuel 22 can be introduced to the air flow 12 at or near the boundary layer 18 by a fuel injector 24. Downstream of the fuel injector 24 is a combustion area 26, which can be, for instance, a transition duct. After the fuel 22 is introduced to the air flow 12, it can travel downstream with the rest of the air flow 12. Experience has shown that concentrations of the fuel 22 remain on the boundary layer 18 of air 12, and such fuel 22 moves at relatively low velocities. Consequently, there is an increased risk that flames from the combustion area 26 will be able to travel upstream through such low velocity fuel 22. If it travels far enough upstream, the flame can be held at the fuel injector 24 due to the continuing supply of fuel 22, which can result in significant and expensive damage to the injector 24 and the component 16.

Some of the existing fuel injection systems attempt to avoid the low velocity profile of the boundary layer 18. One such system 30 is shown in FIG. 2. As shown, a fuel injector 24 projects into the flow path 12 and beyond the boundary layer 18. Thus, when the fuel 22 is introduced to the air flow 12, the fuel 22 does not remain on the boundary layer 18. An example of such a system in a turbine engine is shown in FIG. 3. The combustor section 32 of a turbine engine can include a head end 34. As air 12 from the compressor enters the head-end 34, fuel can be injected into the air flow 12 by a fuel ring 36, which is sometimes referred to as the C-stage. The fuel ring 36 is positioned within the air flow path 12 and away from the boundary layer.

While the systems shown in FIGS. 2 and 3 can minimize the possibility of flame holding, the fuel injectors 24 and/or the fuel ring 36 can fail due to excitations, such as flow induced vibration, combustion dynamics, etc. In addition, placement of the fuel injectors 24 and/or the fuel ring 36 in the flow path 12 can interfere with the aerodynamics of the flow 12 and can cause a drop in the pressure of the air flow 12.

Thus, there is a need for a system for introducing fuel to a flow path that can minimize flame holding potential while avoiding substantial intrusion into the flow path.

SUMMARY OF THE INVENTION

Aspects of the invention are directed to a fuel injection system. The system includes one or more components that define a surface. The one or more components can be, for example, turbine engine combustor components. An airflow passes along the surface, and the airflow includes a boundary layer. One or more fuel nozzles are disposed within the component and are positioned to inject fuel into the airflow substantially at the boundary layer. The fuel nozzle can have an outlet end. In one embodiment, the outlet end can be substantially flush with the surface; thus, the fuel nozzle can be located substantially outside of the airflow. A combustion area receives the fuel and airflow.

The system further includes a turbulence generator positioned at least partially within the boundary layer. The turbulence generator is located downstream of the fuel nozzle. Thus, the turbulence generator causes disturbances in the boundary layer. In one embodiment, the turbulence generator can be a protrusion extending from the surface and into at least a portion of the boundary layer. One or more passages can extend through the protrusion. In such case, a portion of the airflow in the boundary layer can flow through the one or more passages. At least one of the passages can be angled relative to the surface.

In another embodiment, the turbulence generator can be a cross-flow of a fluid into the boundary layer. The fluid can be, for example, high pressure air. The fluid can be introduced at about 90 degrees relative to the surface. The cross-flow can be introduced by a fluid nozzle with an outlet end. The fluid nozzle can be disposed within the component such that the outlet end is substantially flush with the surface. Thus, the fluid nozzle can be located substantially outside of the airflow.

In yet another embodiment, the turbulence generator can be a combination of a cross-flow of a fluid in the boundary layer and a protrusion extending from the surface and into at least a portion of the boundary layer.

The system can further include one or more sensors attached to the surface proximate the turbulence generator. The one or more sensors can be responsive to temperature changes. Thus, the sensor can alert an operator of temperature increases near the turbulence generator, which can indicate flashback or flame holding. In one embodiment, the sensor can be a thermocouple. The one or more sensors can be located substantially adjacently downstream of the turbulence generator.

In another respect, aspects of the invention are directed to a method of introducing fuel to a fluid flow upstream of a combustion area. The method involves passing a fluid flow along a surface. The fluid flow includes a boundary layer. A fuel is injected substantially at the boundary layer. The boundary layer is disturbed downstream of the where the fuel is injected and upstream of a combustion area. In one embodiment, the step of disturbing can be performed by providing one or more protrusions on the surface. Such protrusions can extend into the boundary layer. Alternatively, the step of disturbing can be performed by introducing a cross-flow of fluid in at least the boundary layer.

DETAILED DESCRIPTION OF EMBODIMENTS OF THE INVENTION

Embodiments of the present invention are directed to fuel introduction systems. Various embodiments of the invention will be explained, but the detailed description is intended only as exemplary. Embodiments of the invention are shown in FIGS. 4-7, but the present invention is not limited to the illustrated structure or application.

Figure 4:
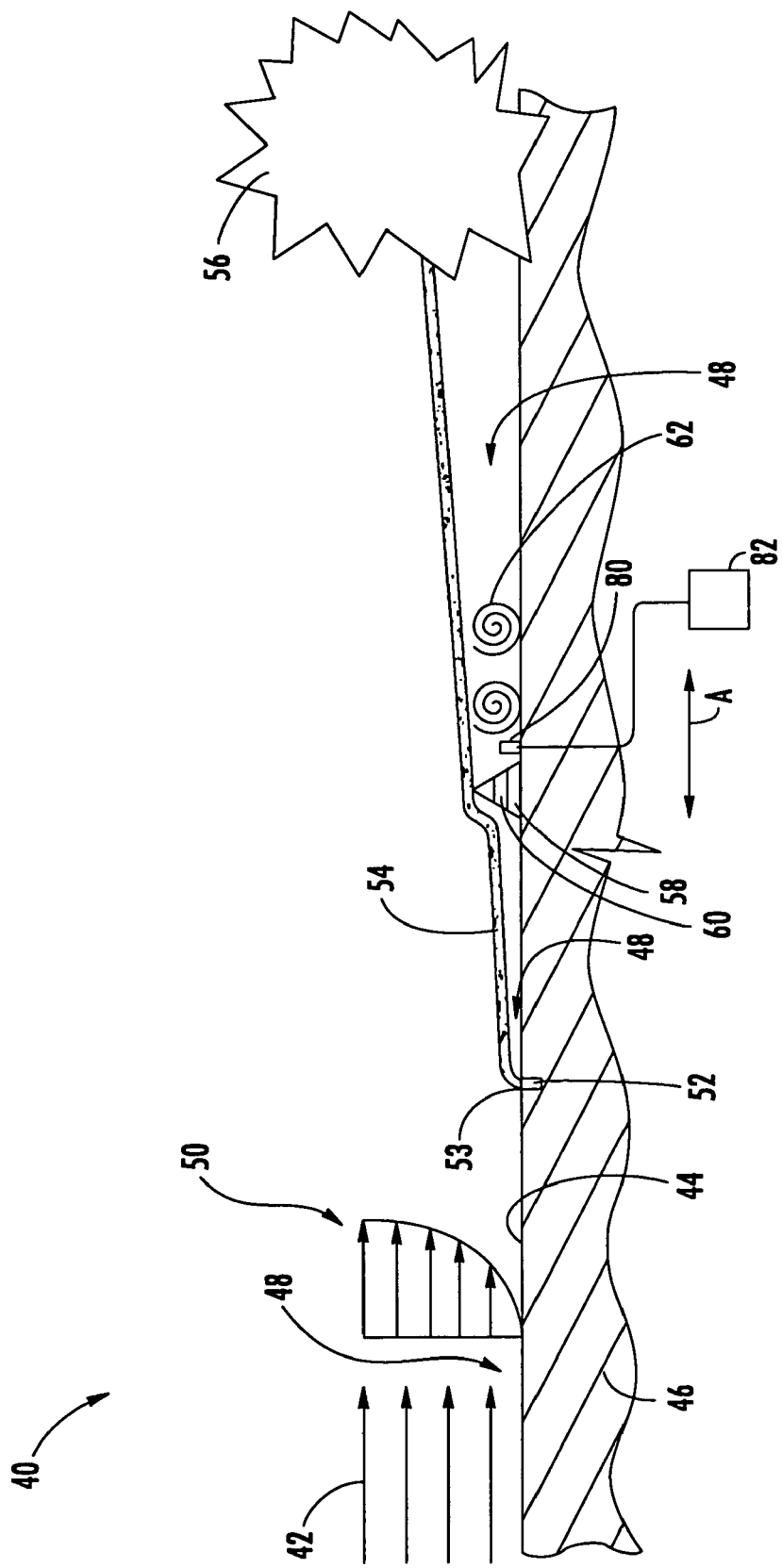
FIG. 4 is a side elevational view of a fuel injection system according to aspects of the invention, wherein boundary layer disturbance is achieved by a protrusion.

One fuel introduction system 40 according to aspects of the invention is shown in FIG. 4. A fluid can pass along at least one surface 44. The surface 44 can be defined by one or more components. In one embodiment, the component can be a turbine engine combustor component 46. However, it should be noted that aspects of the invention are not limited to turbine engines and can be used in almost any combustion-based application. The surface 44 can be substantially flat and it is preferred if the surface is substantially smooth. The one or more surfaces 44 can have any of a number of conformations. For instance, the at least one surface 44 can be substantially planar, circular, oval, rectangular or polygonal, just to name a few possibilities.

In one embodiment, the fluid can be air 42, which can be from the compressor section of the turbine engine. The portion of air flow 42 that is substantially at and proximate to the surface can be referred to as the boundary layer 48. The air flow 42 has an associated velocity profile 50. Regardless of the overall velocity profile 50, the velocity of the air flow 42 in the boundary layer 48 is low, approaching substantially zero at the surface 44. The flow 42 in the boundary layer 48 can be laminar or otherwise substantially non-turbulent.

According to aspects of the invention, fuel 54 can be supplied to the flow 42 in various ways, such as by one or more fuel injectors 52, nozzles or other fuel delivery device. It should be noted that the fuel 54 can be in various states, such as in gas or liquid form. The fuel injectors 52 can have an outlet end 53 through which the fuel 54 exits the injector 52. Preferably, the outlet end 53 of the fuel injector 52 is substantially flush with the surface 44. The phrase "substantially flush" is intended to mean exactly flush as well as the outlet end 53 of the fuel injector 52 extending slightly beyond or being slightly recessed from the surface 44. Thus, it will be appreciated that the fuel 54 can exit the fuel injector 52 in or near the boundary layer 48. Ideally, the fuel injectors 52 can be kept substantially outside of the air flow 42, thereby reducing the exposure of the fuel injectors 52 to operational excitations and potentially averting a pressure drop in the flow 42.

The component can be adapted as necessary to accommodate the fuel injectors 52. The fuel injector 52 can be oriented in various ways relative to the surface 44. For example, the fuel injector 52 can be oriented substantially normal to the surface 44. There can be any quantity of fuel injectors 52. For example, when the surface 44 is substantially cylindrical in conformation, there can be a plurality of injectors 52 (only one of which is shown) arrayed about the surface 44. In the case of multiple injectors 52, the injectors 52 can be substantially equally or non-equally spaced from each other. Likewise, one or more of the injectors 52 can be offset from the other injectors 52, such as in the direction of the flow A.

A combustion area 56 is located downstream of the fuel injectors 52. The path of the flow 42 from the fuel injectors 52 to the combustion area 56 can be substantially straight, or it can include at least one bend, turn or curve.

According to aspects of the invention, the system 40 can be configured to cause a disturbance of the boundary layer 48 downstream of the fuel injector 52. To that end, the system can include a turbulence generator provided at least partially within the boundary layer 48. Preferably, the turbulence generator is located as far downstream from the fuel injectors 52 as possible.

The turbulence generator can be any of a number of disturbance causing devices, systems, and/or arrangements. In one embodiment, the turbulence generator can be a contour of the surface 44. For instance, the surface contour can be a protrusion 58 extending from the surface 44. The protrusion 58 can have any cross-sectional shape. For instance, the protrusion 58 can be substantially semi-circular or substantially triangular in conformation, but other shapes are possible. The protrusion 58 can extend along the surface 44 and is preferably substantially transverse to the direction of flow A. The size of the protrusion 58 including the distance that it projects from the surface 44 can be a function of the velocity of the flow 42 and the quantity of fuel 54 involved, among other things.

The protrusion 58 can extend substantially continuously along the surface 44. In such case, the protrusion 58 can have one or more passages 60 extending therethrough. Ideally, these passages 60 are substantially parallel to the surface 44. A portion of the air 42 in the boundary layer can flow through the passages 60, thereby increasing the velocity of the air 42 in the boundary layer 48. In one embodiment, the passages 60 can be angled relative to the surface 44 to cause turbulence 62, such as swirls, within the boundary layer 48. The passages 60 can have a substantially constant cross-sectional area. In one embodiment, there can be reductions in the cross-sectional area of the passages 60. In the case of two or more passages 60, the passages 60 can be substantially identical, or at least one of the passages 60 can be different from the other passages 60 in one or more respects.

Instead of being a single continuous piece, the protrusion 58 can be defined by two or more discrete protrusion segments (not shown). The two or more protrusion segments can be substantially aligned in a row along the surface 44. The protrusion segments can be in abutting relation. At least one protrusion segment can be offset from the other segments, such as in the direction of the flow A. While it is preferred if the individual protrusion segments are substantially identical to each other, at least one of the protrusion segments can be different in any of a number of respects.

Figure 5:
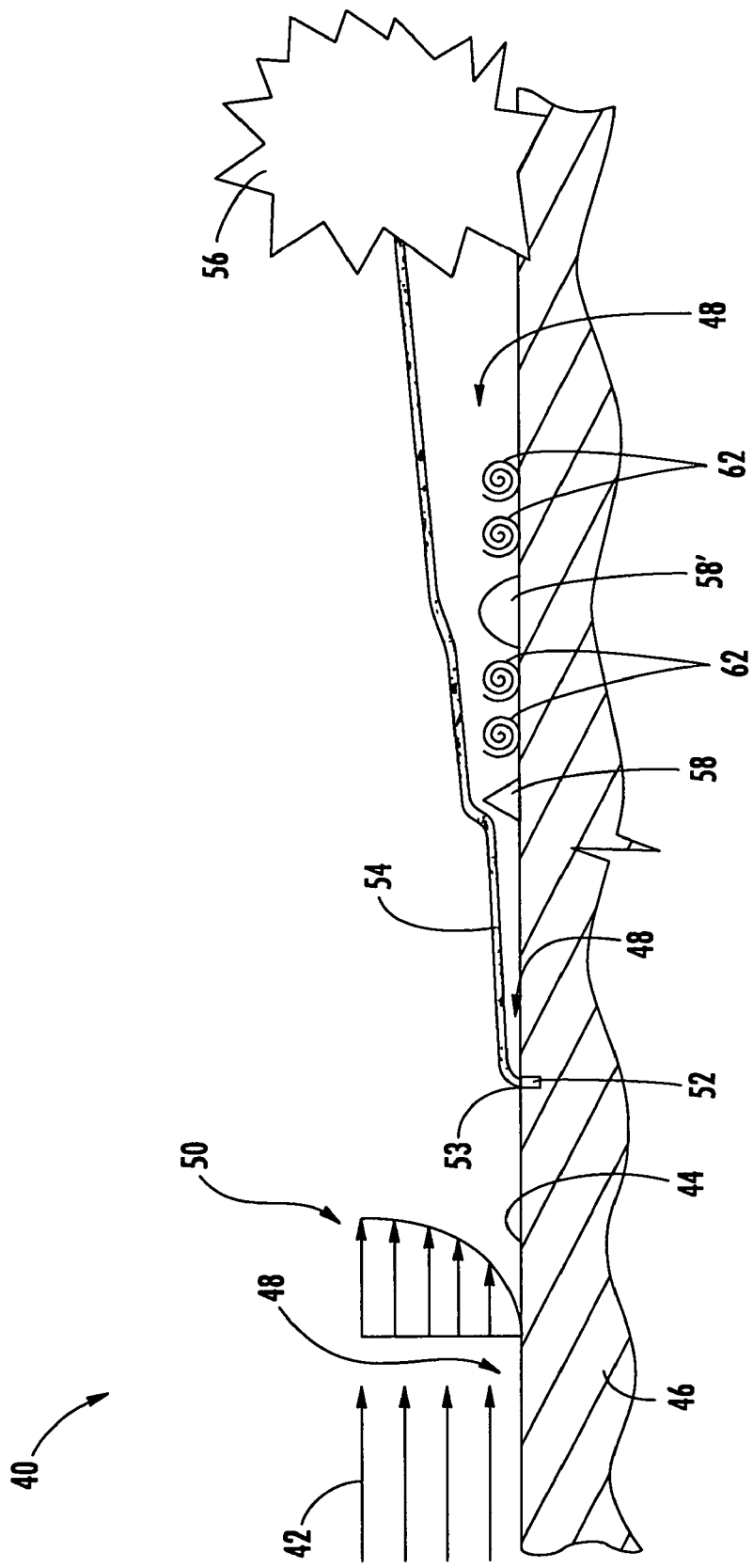
FIG. 5 is a side elevational view of an alternative fuel injection system according to aspects of the invention, wherein boundary layer disturbance is achieved by at least two rows of protrusions.

There can be one or more rows of protrusions 58. When multiple rows of protrusions are provided, as shown in FIG. 5, the protrusion 58 defining one row may or may not be substantially identical to the protrusion 58' defining another row.

The protrusions 58 can be provided on the surface 44 in many ways. For example, the protrusions 58 can be secured by welding, fasteners (such as pins, bolts or stakes) and/or adhesives, just to name a few possibilities. When fasteners are used, it is preferred if the fasteners can accommodate thermal growth of the protrusion 58 and/or component. Alternatively, the protrusions 58 can be unitary with the surface 44, such as by casting or machining.

Figure 6:
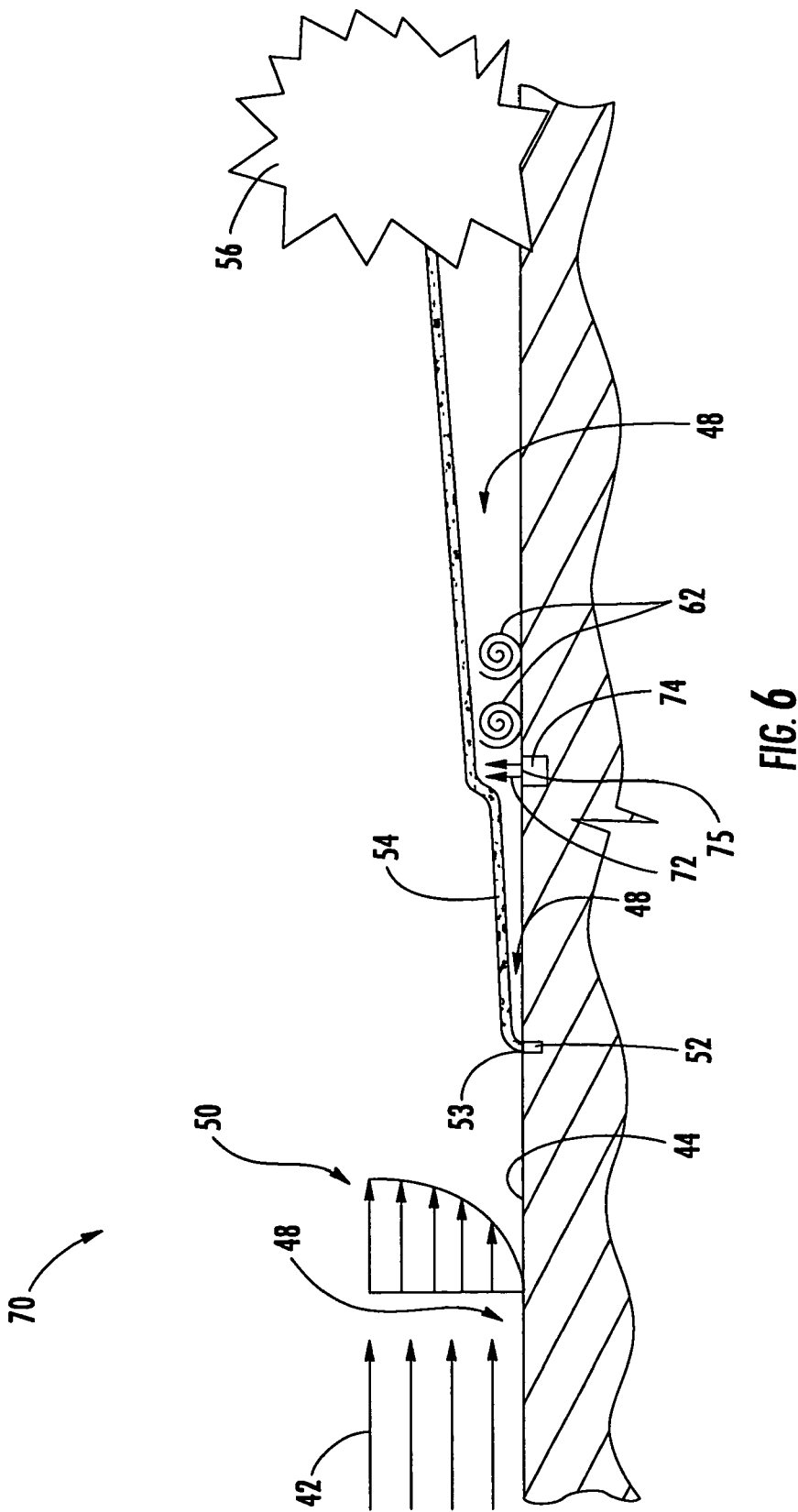
FIG. 6 is a side elevational view of another alternative fuel injection system according to aspects of the invention, wherein boundary layer disturbance is achieved by a fluid cross-flow.

The turbulence generator according to aspects of the invention is not limited to being a protrusion 58 or any other surface feature. In one alternative system 70, as shown in FIG. 6, the turbulence generator can be a fluid cross flow 72 that causes disturbances 62 in the boundary layer 48. That is, a fluid can be injected into at least the boundary layer 48 so as to create turbulence 62 in the boundary layer 48. Injection of the fluid can be substantially continuous, or it can be at intervals, regular or irregular or otherwise as needed. Such fluid can be introduced downstream of the fuel injector 52, preferably as far downstream as possible. In one embodiment, the fluid 72 can be high pressure air. The air can be taken from a bypass location in the turbine engine, or the air can be taken from an independent source.

Air is only one example of a suitable fluid that can be used according to aspects of the invention. Aspects of the invention are not limited to any particular fluid 72, and the fluid 72 can be in gas or liquid form. Ideally, the fluid 72 is selected so that that it will not substantially impede or otherwise interfere with the combustion process. It is also preferred if the fluid 72 is at a sufficient temperature so as not to detract from the combustion process. Further, the fluid 72 is preferably selected so as to have a minimal, if any, effect on the production of exhaust pollutants.

The fluid 72 can be delivered by one or more injectors 74, nozzles and/or other fluid delivery devices. There can be any number of injectors 74, and the injectors 74 can be arranged in any of a number of ways including at least those discussed above in connection with the fuel injectors 52. The injectors 74 can include an outlet end 75. Preferably, the outlet ends 75 of the injectors 74 are substantially flush with the surface 44. Because the fluid injectors 74 are substantially outside of the path of the air flow 42, the likelihood of excitation-related failure of the injectors 74 can be reduced. Further, by keeping the injectors 74 out of the air flow 42, the injectors 74 will not significantly contribute to a pressure drop in the air flow 42.

Figure 7:
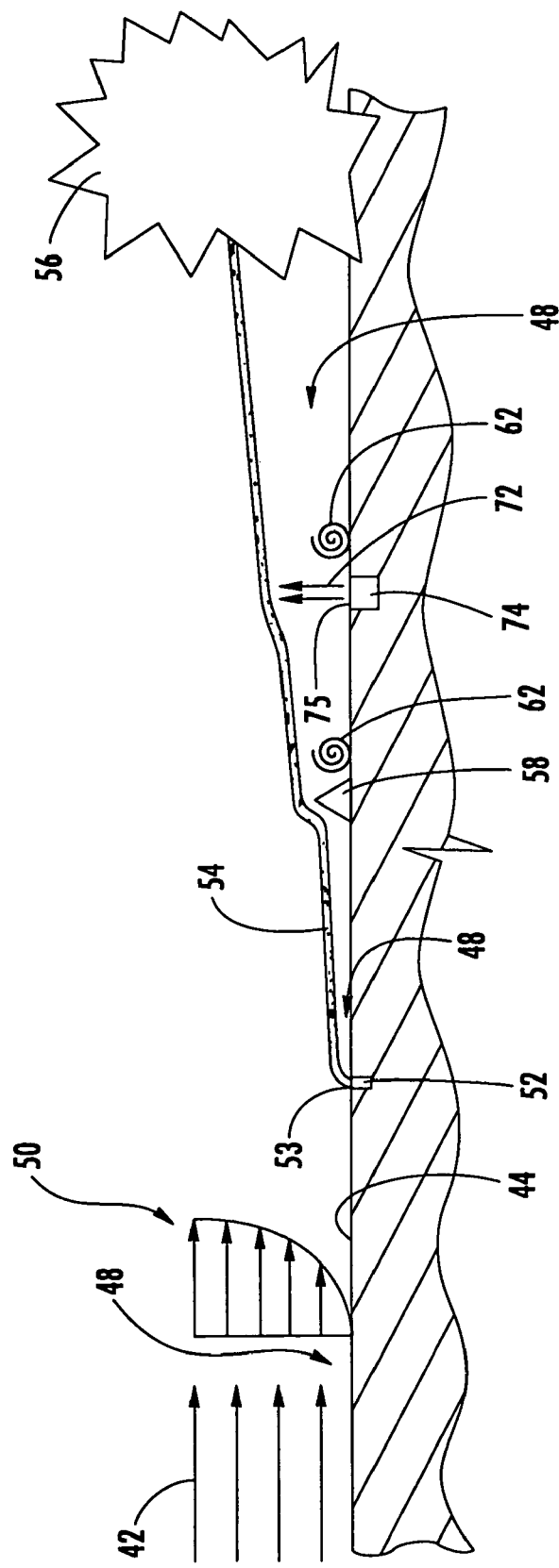
FIG. 7 is a side elevational view of still another alternative fuel injection system according to aspects of the invention, wherein boundary layer disturbance is achieved by a combination of a protrusion and a fluid cross-flow.

The above described cross-flow is yet another manner of achieving a disturbance in the boundary layer 48 of the flow 42. The turbulence generator according to aspects of the invention can further include a combination of a surface contour and a fluid cross-flow. For example, as shown in FIG. 7, both a protrusion 58 and a fluid injector 74 can be provided downstream of the fuel injectors 52. While FIG. 7 shows the protrusion 58 located upstream of the fluid injector 74, aspects of the invention include the opposite arrangement in which the protrusion 58 is located downstream of the fluid injector 74. The turbulence generator according to aspects of the invention can encompass almost any system or structure that can disturb the boundary layer 48 downstream of the fuel injector 52, and aspects of the invention are not limited to the specific manners described herein.

Preferably, the turbulence generator only affects the boundary layer 48 of the flow 42. Thus, any disturbances 62 caused by the turbulence generator can occur substantially entirely within the boundary layer 48 of the flow 42; that is, there is minimal or no disturbance in the flow 42 outside of the boundary layer 48. In one embodiment, the turbulence generator can be completely within the boundary layer 48. While the turbulence generator can extend beyond the boundary layer 48, it is preferred if the turbulence generator does not extend substantially beyond the boundary layer 48.

The basic operation of the invention will be described. Fuel 54 can be introduced to the air flow 42 by the fuel injectors 52. As the fuel 54 travels downstream, concentrations of the fuel 54 can remain engaged with the boundary layer 48. When it encounters the turbulence generator, the boundary layer 48 can be disrupted so that turbulence 62 can be created downstream of the turbulence generator. As a result of such disturbances in the boundary layer 48, the velocity of the fuel 54 that was previously in substantial engagement with the boundary layer 48 can increase. Further, the turbulence 62 can also promote mixing of the fuel 54 and air 42.

The disturbance in the boundary layer 48 can be further increased by providing passages 60 in the protrusion 58, as discussed previously. Air 42 passing though the passages 60 can cause additional disruptions in the downstream air flow. In some instances, the velocity of some vector components of the flow can increase as a result of the air 42 passing through the passages 60.

Downstream of the protrusion 58, the fuel 54 and air 42 can enter and be ignited in the combustion area 56, which can include flames. According to aspects of the invention, such flames can be substantially impeded from traveling upstream toward the fuel injector 52 because of the increased velocity of fuel at the boundary layer 48. While not entirely eliminating flashback, aspects of the invention can reduce the likelihood that the flame will reach the fuel injector 52. Thus, the invention can minimize flame sustainability. Further, as noted previously, the fuel injectors 52 can be substantially located outside of the flow path, thereby minimizing concerns of failure of the injectors 52 due to various operational excitations.

Aspects of the invention can further include sensors to detect flashback at or near the location of the boundary layer disturbance. Ideally, the sensors are located substantially proximately downstream of the protrusion 58 or fluid cross-flow 72. In one embodiment, the sensors can be thermocouples 80. The thermocouples 80 can be operatively connected to a detection circuit 82, which can be external to the engine. The thermocouple 80 can be responsive to the increased heat produced by flashback or flame holding, thereby alerting an operator of such events. To avoid damage, the operator can change operating conditions, such as reducing engine load, or the operator can shut down the engine.

Figure 1:
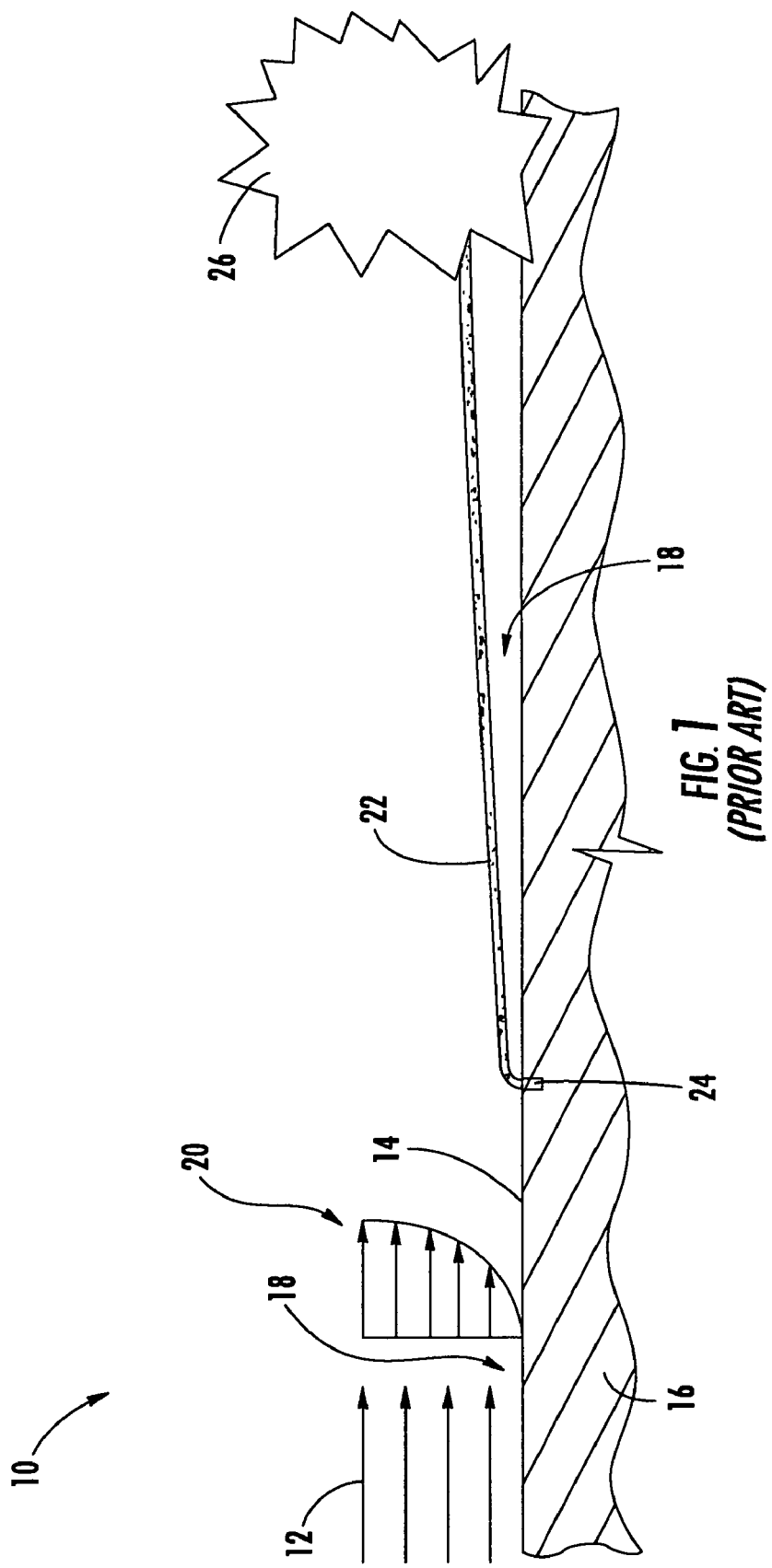
FIG. 1 is a side elevational view of a prior fuel injection system.
Figure 2:
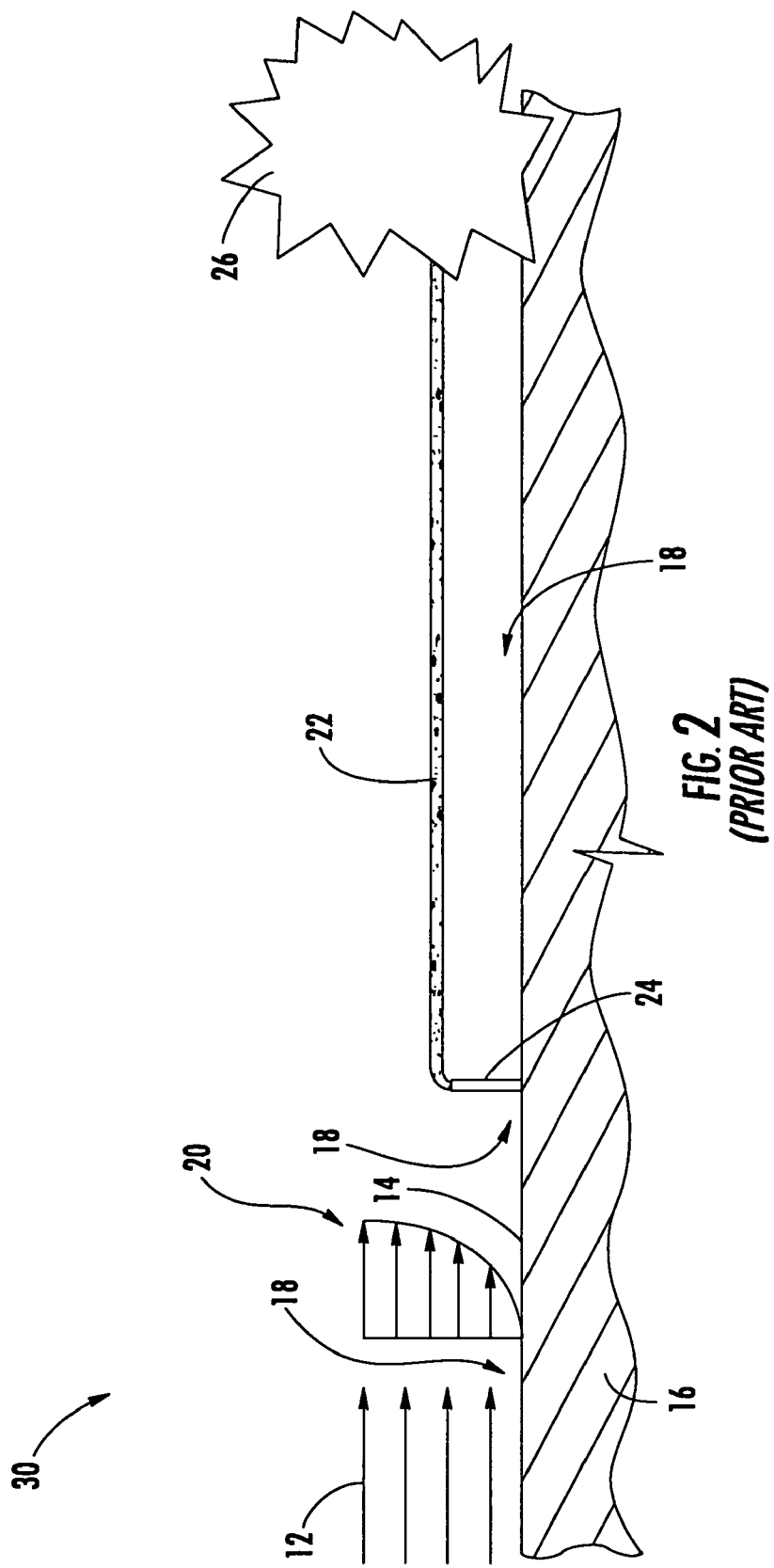
FIG. 2 is a side elevational view of a second prior fuel injection system.
Figure 3:
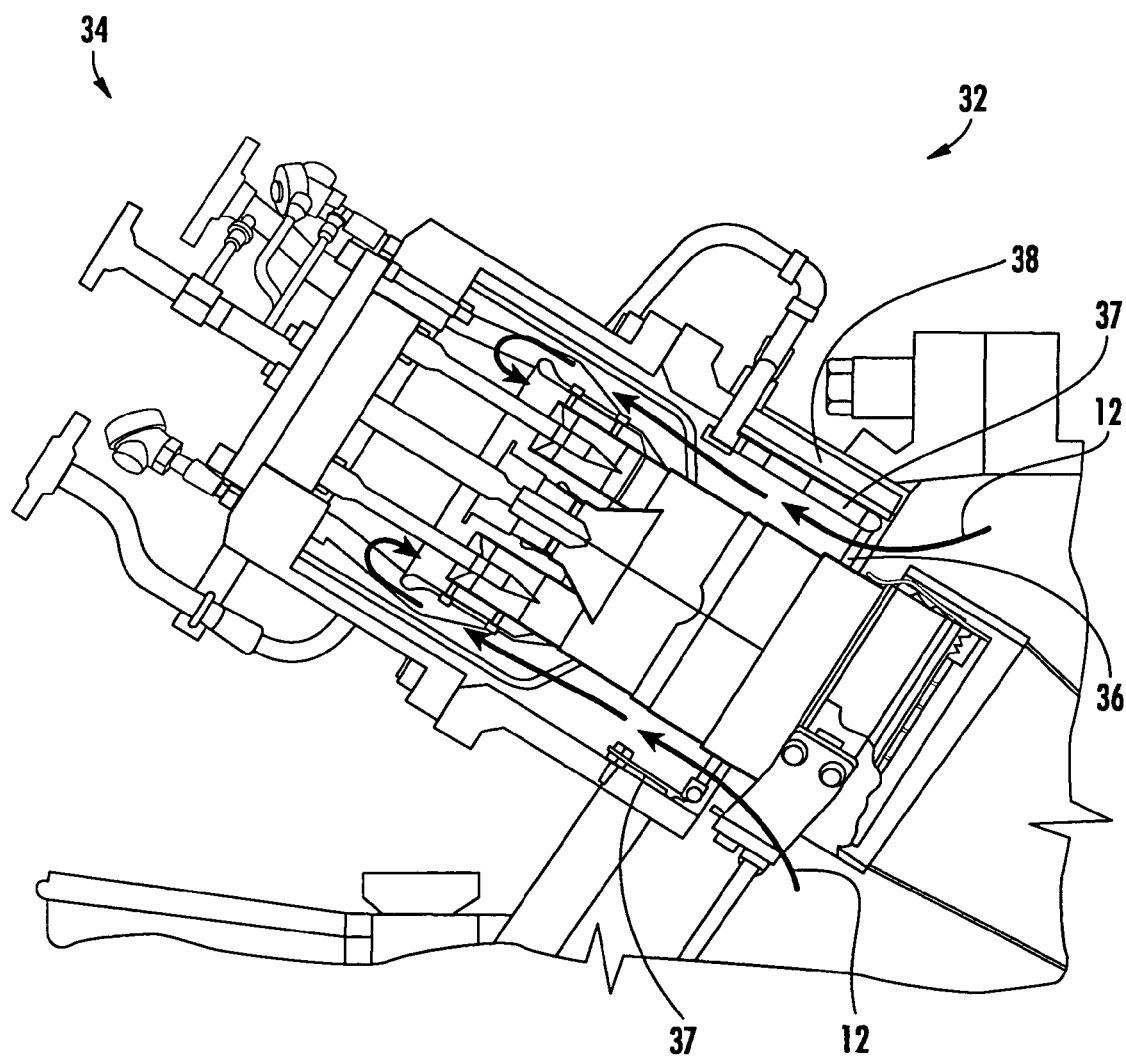
FIG. 3 is a side elevational view of a third prior fuel injection system.

Aspects of the invention can be applied to known turbine engine combustors. For instance, by applying aspects of the invention to the combustor shown in FIG. 3, the fuel ring 36 and any associated hardware 37 can be removed from the path of the air flow 12 and integrated into the surrounding shell 38 in any of the manners discussed above. The absence of the fuel ring 36 in the flow path can have numerous benefits including: avoidance of potential excitation; robustness to excitations; and smaller pressure drops in the flow path.

The foregoing description is provided in the context of various possible systems for introducing fuel to a flow upstream of a combustion environment. It will of course be understood that the invention is not limited to the specific details described herein, which are given by way of example only, and that various modifications and alterations are possible within the scope of the invention as defined in the following claims.

What is claimed is:

1. A fuel injection system comprising:
   at least one component defining a surface;
   an airflow passing along the surface, the airflow including a boundary layer;
   at least one fuel nozzle disposed within the component, wherein the at least one fuel nozzle is positioned to inject fuel into the airflow substantially at the boundary layer;
   a first turbulence generator positioned at least partially within the boundary layer, wherein the first turbulence generator is located downstream of the fuel nozzle, whereby the first turbulence generator causes disturbances in the boundary layer;

a second turbulence generator positioned at least partially within the boundary layer, wherein the second turbulence generator is located downstream of the fuel nozzle and wherein the second turbulence generator is spaced from the first generator in the direction of the airflow, whereby the second turbulence generator causes disturbances in the boundary layer, one of the first and second turbulence generators being a protrusion extending from the surface, a passage extending through the protrusion from an upstream inlet with respect to the airflow to a downstream outlet with respect to the airflow, the inlet being in fluid communication with an upstream portion of the boundary layer and the outlet being in fluid communication with a downstream portion of the boundary layer, wherein a portion of airflow in the upstream portion of the boundary layer is received in the inlet and exits from the outlet into the downstream portion of the boundary layer; and a combustion area receiving the fuel and airflow.

2. The system of claim 1 wherein the at least one component is a turbine engine combustor component.

3. The system of claim 1 further including at least one sensor attached to the surface so as to be substantially proximate to one of the first turbulence generator and the second turbulence generator, wherein the at least one sensor is responsive to temperature changes, whereby the sensor alerts an operator of temperature increases near the respective one of the turbulence generators indicative of flashback or flame holding.

4. The system of claim 3 wherein the at least one sensor is located downstream of the respective one of the turbulence generators.

5. The system of claim 3 wherein the at least one sensor is a thermocouple.

6. The system of claim 1 wherein the fuel nozzle has an outlet end, wherein the outlet end is substantially flush with the surface, whereby the fuel nozzle is located substantially outside of the airflow.

7. A fuel injection system comprising:
at least one component defining a surface;
an airflow passing along the surface, the airflow including a boundary layer;
at least one fuel nozzle disposed within the component, wherein the at least one fuel nozzle is positioned to inject fuel into the airflow substantially at the boundary layer;
a protrusion extending from the surface and into at least a portion of the boundary layer, wherein the protrusion is located downstream of the fuel nozzle, whereby the protrusion generates turbulence in the boundary layer, a passage extending through the protrusion from an upstream inlet with respect to the airflow to a downstream outlet with respect to the airflow, the inlet being in fluid communication with an upstream portion of the boundary layer and the outlet being in fluid communication with a downstream portion of the boundary layer, wherein a portion of airflow in the upstream portion of the boundary layer is received in the inlet and exits from the outlet into the downstream portion of the boundary layer; and
a combustion area downstream of the protrusion, the combustion area receiving the fuel an airflow.

8. The system of claim 7 wherein the at least one passage is angled relative to the surface.

9. The system of claim 1 wherein the other one of the first turbulence generator and the second turbulence generator is a cross-flow of a fluid into the boundary layer.

10. The system of claim 9 wherein the fluid is high pressure air.

11. The system of claim 9 wherein the fluid is introduced at about 90 degrees relative to the surface.

12. The system of claim 9 further including at least one sensor attached to the surface proximate the cross-flow, wherein the at least one sensor is responsive to temperature changes, whereby the sensor alerts an operator of temperature increases near the cross-flow indicative of flashback or flame holding.

13. The system of claim 12 wherein the at least one sensor is located substantially adjacently downstream of the cross-flow.

14. The system of claim 12 wherein the at least one sensor is a thermocouple.

15. The system of claim 9 wherein the cross-flow is introduced by a fluid nozzle disposed within the component, wherein the fluid nozzle has an outlet end, wherein the outlet end is substantially flush with the surface, whereby the fluid nozzle is located substantially outside of the airflow.

16. A method of introducing fuel to a fluid flow upstream of a combustion area comprising:
passing a fluid flow along a surface, wherein the fluid flow includes a boundary layer; injecting a fuel substantially at the boundary layer; and
disturbing the boundary layer downstream of where the fuel is injected and upstream of a combustion area by providing at least one protrusion on the surface, wherein the protrusion extends into the boundary layer such that turbulence is generated in the boundary layer downstream of the protrusion, a passage extending through the protrusion from an upstream inlet with respect to the airflow to a downstream outlet with respect to the fluid flow, the inlet being in fluid communication with an upstream portion of the boundary layer and the outlet being in fluid communication with a downstream portion of the boundary layer, wherein a portion of fluid flow in the upstream portion of the boundary layer is received in the inlet and exits from the outlet into the downstream portion of the boundary layer.

* * * * *